United States Patent
Lipchin et al.

(10) Patent No.: US 11,157,734 B1
(45) Date of Patent: Oct. 26, 2021

(54) AUTONOMOUS SELF-LEARNING ARTIFICIAL INTELLIGENCE INTENT SYSTEM FOR ACCESS CONTROL

(71) Applicant: MOTOROLA SOLUTIONS, INC., Chicago, IL (US)

(72) Inventors: Aleksey Lipchin, Newton, MA (US); Kaveh Malakuti, Vancouver (CA); Pietro Russo, Melrose, MA (US); Ron Wilson, Oceanside, CA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/108,852

(22) Filed: Dec. 1, 2020

(51) Int. Cl.
| | |
|---|---|
| *G06K 9/00* | (2006.01) |
| *G07C 9/26* | (2020.01) |
| *G07C 9/00* | (2020.01) |
| *G07C 9/37* | (2020.01) |

(52) U.S. Cl.
CPC ..... *G06K 9/00624* (2013.01); *G06K 9/00335* (2013.01); *G07C 9/00309* (2013.01); *G07C 9/00571* (2013.01); *G07C 9/26* (2020.01); *G07C 9/37* (2020.01)

(58) Field of Classification Search
None
See application file for complete search history.

(56) References Cited

U.S. PATENT DOCUMENTS

| | | | |
|---|---|---|---|
| 7,849,041 B2 | 12/2010 | Forbes et al. | |
| 2016/0189509 A1* | 6/2016 | Malhotra | G08B 21/18 340/541 |
| 2018/0018508 A1 | 1/2018 | Tusch | |

FOREIGN PATENT DOCUMENTS

WO 2017202169 A1 11/2017

OTHER PUBLICATIONS

Bertsch, "Sensor Network Trained to Understand Arbitrary Labels," Technical Disclosure Commons, 2018, pp. 1-23.

* cited by examiner

*Primary Examiner* — Carlos Garcia
(74) *Attorney, Agent, or Firm* — Michael Best & Friedrich LLP

(57) ABSTRACT

One embodiment provides an access control system including access control sensors to detect actions performed in a vicinity of an access point, a verification sensor to verify access of the access point, and an electronic processor communicatively coupled to the access control sensors and the verification sensor. The electronic processor is configured to in response to an access intent model satisfying an accuracy condition, deploy the access intent model for the access point and receive a dataset indicating an action performed in the vicinity of the access point. The electronic processor is also configured to predict an access intent to access the access point by applying the access intent model to the dataset and enable access through the access point. The electronic processor is further configured to receive verification data indicating whether the access point is accessed, and automatically assign a label to the dataset based on the verification data.

20 Claims, 4 Drawing Sheets

AUTONOMOUS SELF-LEARNING ARTIFICIAL INTELLIGENCE INTENT SYSTEM FOR ACCESS CONTROL

BACKGROUND OF THE INVENTION

Access points are used in buildings to provide controlled or automatic access to persons entering and exiting through the building or through suites in the building. Access through the access points may be controlled, for example, using active and/or passive access control. An active system typically requires visual monitoring of the access point by an individual either on site or at a remote location. Passive access control does not require human monitor and may utilize, for example, a key card or sensor. In one example, one or more infrared sensors are provided above or near the access point.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
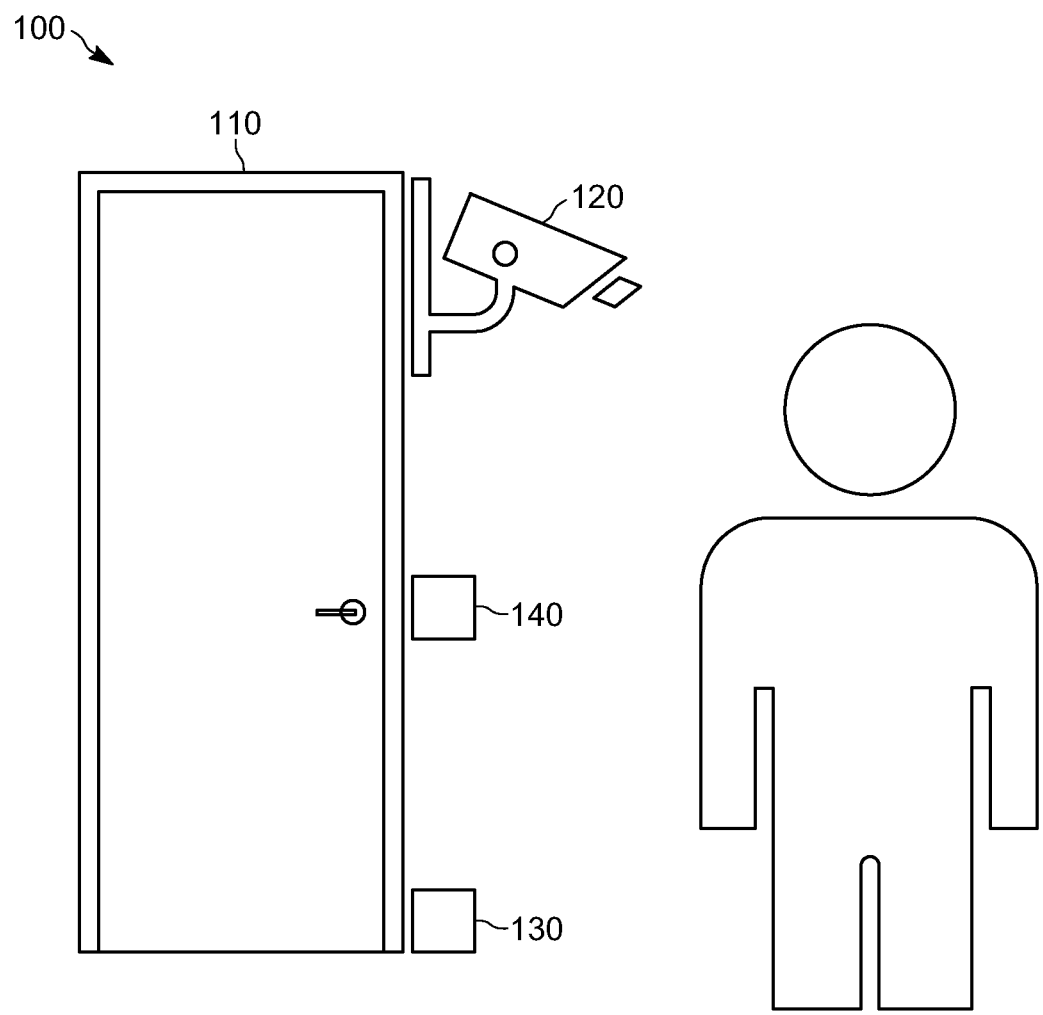
FIG. 1 illustrates an access point in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

A basic access control system, for example, a system that uses photo electric sensors (visible or infrared light) makes access through an access point easy. An event or circumstance is detected and the access point is opened. However, designers of access point systems may have to consider other factors in addition to ease of access. In one example, automatic doors may be provided that open based on detecting a circumstance near the door. Typically, in these systems, the automatic doors open regardless of the intent of a person near the doors to enter the building. That is, the system cannot differentiate between a person intending to enter the building and a person simply walking by the building. Among other shortcomings of such as system, opening door simply upon detecting an event or circumstance results in inefficiencies in heating and cooling systems of the building.

In some instances, efficiency of an access point can be improved by using a system that actually detects a person and, more than that, determines an intent of a person to access an access point. A machine learning system could be used to detect or determine an intent of the person. However, such a system would need large amounts of data for training the system before the system could be effectively utilized at an access point. The training data may be obtained from available access points to train a single model for every access point. This may result in lower accuracy of the model for each individual access point where the model is deployed. The training data may also be obtained from the specific access point where the model is deployed. This may raise other challenges, for example, the training may be technically difficult due to a large amount of training that need to be performed and/or legal difficulties for privacy reasons. Additionally, such a system may not be portable or transferable between different access points. Rather, each machine learning access control system may need to be trained off-site for the specific access point where the system is to be deployed.

Accordingly, there is a need for an autonomous, self-learning, artificial intelligence intent system for access control that is easily deployable at an access point.

One embodiment provides an access control system including one or more access control sensors configured to detect actions performed by one or more persons in a vicinity an access point, a verification sensor configured to verify access of the access point by the one or more persons, and an electronic processor communicatively coupled to the one or more access control sensors and the verification sensor. The electronic processor is configured to in response to an access intent model satisfying an accuracy condition, deploy the access intent model for the access point and receive, from the one or more access control sensors, a dataset indicating an action performed by one or more persons in the vicinity of the access point. The electronic processor is also configured to predict an access intent of the one or more persons to access the access point by applying the access intent model to the dataset and enable access through the access point. The electronic processor is further configured to receive, from the verification sensor, verification data indicating whether the one or more persons accessed the access point, and automatically assign a label to the dataset based on the verification data. The label indicates whether the one or more persons accessed the access point.

Another embodiment provides a method of providing access control including in response to an access intent model satisfying an accuracy condition, deploying the access intent model for an access point and receiving, from one or more access control sensors configured to detect actions performed by one or more persons in a vicinity of the access point, a dataset indicating an action performed by the one or more persons in the vicinity of the access point. The method also includes predicting, with an electronic processor, an access intent of the one or more persons to access the access point by applying the access intent model to the dataset and enabling, with the electronic processor, access through the access point. The method further includes receiving, from a verification sensor configured to verify access of the access point by the one or more persons, verification data indicating whether the one or more persons accessed the access point and automatically assigning, with the electronic processor, a label to the dataset based on the verification data. The label indicating whether the one or more persons accessed the access point.

FIG. 1 illustrates an example access point 100 including an entryway 110, one or more access control sensors 120, a verification sensor 130, and an actuator 140. The access point 100 may be provided in a building, for example, an office building, a residential building, a stadium, an arena, a park, an amusement center, and/or the like. In the example illustrated, the entryway 110 is a manually operated door. In some embodiments, the entryway 110 may include automatically opening and closing doors, doors that provide handicap access, turnstiles, and/or the like.

In the example illustrated in FIG. 1, the one or more access control sensors 120 includes a video camera. The video camera is, for example, a two-dimensional video camera, a three-dimensional video camera, a time-of-flight camera, a red-green-blue (RGB) camera, and/or the like. In some embodiments, the one or more access control sensors 120 includes a combination of different kinds of sensors, for example, a video camera and an infrared sensor, a video camera and a Bluetooth® sensor, an LiDAR sensor and a Bluetooth® sensor, and/or any other combination of sensors. The one or more access control sensors 120 may also include presence sensors, motion sensors, and the like. The one or more access control sensors 120 is configured to detect actions performed by persons near (for example, in the vicinity of) the access point 100. For example, the one or more access control sensors 120 may detect whether a person is walking toward the entryway 110, whether the person walking by (or traverse to) the entryway 110, any objects in possession of the person, and/or the like.

The verification sensor 130 is, for example, an actuation sensor configured to detect whether a person(s) accessed the building through the access point 100. The verification sensor 130 includes, for example, an optical sensor that detects that a person passed through the access point 100 when a light beam between an emitter and a receiver is broken momentarily. The verification sensor 130 may include other forms of sensors configured to verify access of the access point 100 by the one or more persons.

The actuator 140 is, for example, a motor or a solenoid to actuate a lock of the entryway 110 or to actuate doors of the entryway 110. The actuator 140 actuates the access based on a signal or information from the one or more access control sensors 120 (for example, based on information from the first sensor processed by an electronic processor and as commanded by the electronic processor). The verification sensor 130 determines whether a person has accessed the building through the access point 100 when the actuator 140 actuates the access. FIG. 1 illustrates only one example embodiment of the access point 100. The access point 100 may include more or fewer components and may perform additional functions other than those described herein.

Figure 2:
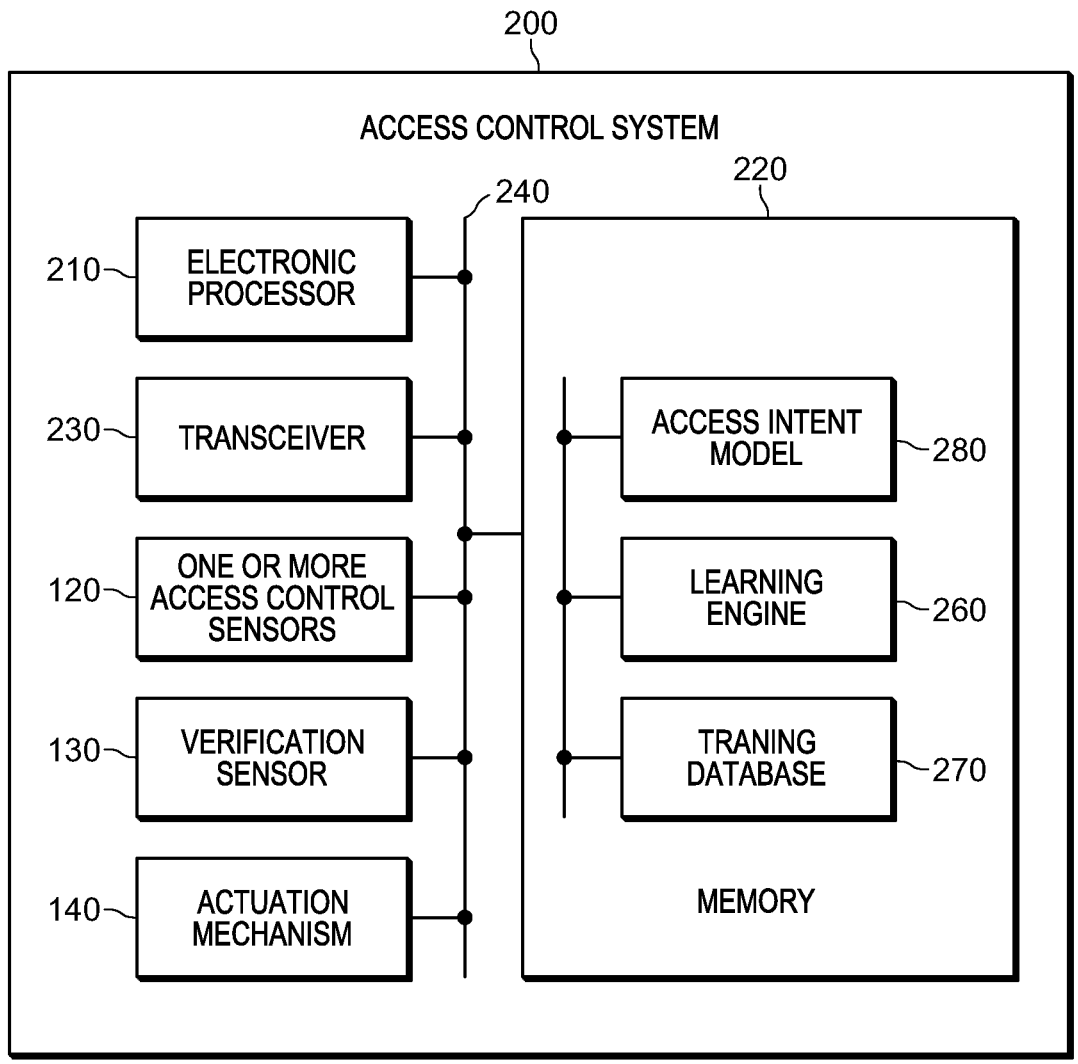
FIG. 2 is a block diagram of an access control system of the access point of FIG. 1 in accordance with some embodiments.

FIG. 2 is a block diagram of an example access control system 200 for the access point 100. The access control system 200 includes the one or more access control sensors 120, the verification sensor 130, the actuator 140, an electronic processor 210, a memory 220, and a transceiver 230. The one or more access control sensors 120, the verification sensor 130, the actuator 140, the electronic processor 210, the memory 220, and the transceiver 230 communicate over one or more control and/or data buses (for example, a communication bus 240). FIG. 2 illustrates only one example embodiment of the access control system 200. The access control system 200 may include more or fewer components and may perform additional functions other than those described herein.

In some embodiments, the electronic processor 210 is implemented as a microprocessor with separate memory, such as the memory 220. In other embodiments, the electronic processor 210 may be implemented as a microcontroller (with memory 220 on the same chip). In other embodiments, the electronic processor 210 may be a special purpose processor designed to implement neural networks for machine learning. In other embodiments, the electronic processor 210 may be implemented using multiple processors. In addition, the electronic processor 210 may be implemented partially or entirely as, for example, a field programmable gate array (FPGA), an applications-specific integrated circuit (ASIC), and the like and the memory 220 may not be needed or be modified accordingly. In the example illustrated, the memory 220 includes non-transitory, computer-readable memory that stores instructions that are received and executed by the electronic processor 210 to carry out the functionality of the access control system 200 described herein. The memory 220 may include, for example, a program storage area and a data storage area. The program storage area and the data storage area may include combinations of different types of memory, such as read-only memory, and random-access memory. In some embodiments, the access control system 200 may include one electronic processor 210, and/or plurality of electronic processors 210, for example, in a cluster arrangement, one or more of which may be executing none, all, or a portion of the applications of the access control system 200 described below, sequentially or in parallel across the one or more electronic processors 210. The one or more electronic processors 210 comprising the access control system 200 may be geographically co-located or may be geographically separated and interconnected via electrical and/or optical interconnects. One or more proxy servers or load balancing servers may control which one or more electronic processors 210 perform any part or all of the applications provided below.

The transceiver 230 enables wired and/or wireless communication between the access control system 200 and a remote server or other devices. In some embodiments, the transceiver 230 may comprise separate transmitting and receiving components.

In the example illustrated, the memory 220 stores several applications that are executed by the electronic processor 210. In the example illustrated, the memory 220 includes a learning engine 260, a training database 270, and an access intent model 280. The access intent model 280 is an application that is executed to determine an intent of a person near the access point 100. Specifically, the access intent model 280 is executed to predict whether a person intends to enter through the access point 100 based on actions performed by the person that are detected by the one or more access control sensors 120. The learning engine 260 is executed to train the access intent model 280 based on training data received from the one or more access control sensors 120, the verification sensor 130, and/or the training database 270.

In the example provided in FIG. 2, a single device is illustrated as including all the components and the applications of the access control system 200. However, one or more of the components and one or more of the applications may be combined or divided into separate software, firmware, and/or hardware. Regardless of how they are combined or divided, these components and applications may be executed on the same computing device or may be distributed among different computing devices connected by one or more networks or other suitable communication means. In one example, all the components and applications of the access control system 200 are implemented in a cloud infrastructure accessible through several terminal devices, with the processing power located at a server location. In another example, the components and applications of the access control system 200 may be divided between separate building computing devices co-located at the building. In yet another example, the components and applications of the access control system 200 may be divided between separate computing devices not co-located with each other but communicatively connected with each other over a suitable communication network.

Artificial intelligence systems are typically trained at a developer's site using a large amount of training data. The training data may not be obtained from use cases to which the artificial intelligence system is applied to. Rather, the training data may be example data or data obtained from testing at the developer's site. The training data may also have a distribution different from the data in the environment where the access control system 200 would be deployed in. One disadvantage of such a method is that when the use cases differ from one application to another, the artificial intelligence system does not perform accurately. For example, when an artificial intelligence system is used to detect an intent of a person at different access points, the artificial intelligence system may be trained at the developer's site using examples from an access point 100 of a grocery store. However, this artificial system cannot then be used for access control at, for example, an access point 100 of an office building as the actions performed by persons entering each facility differ significantly. In some instances, it is also not feasible to collect sensor data from each access point 100 and manually annotate the data for training the access control system 200.

The access control system 200 is configured such that the access control system 200 can be trained on site at the access point 100 rather than at a developer's site. This allows the access control system 200 to be readily deployed at any access point 100. The access control system 200 is configured to self-train, self-test, self-deploy, and self-calibrate at the access point 100 rather than at a developer's site.

Figure 3:
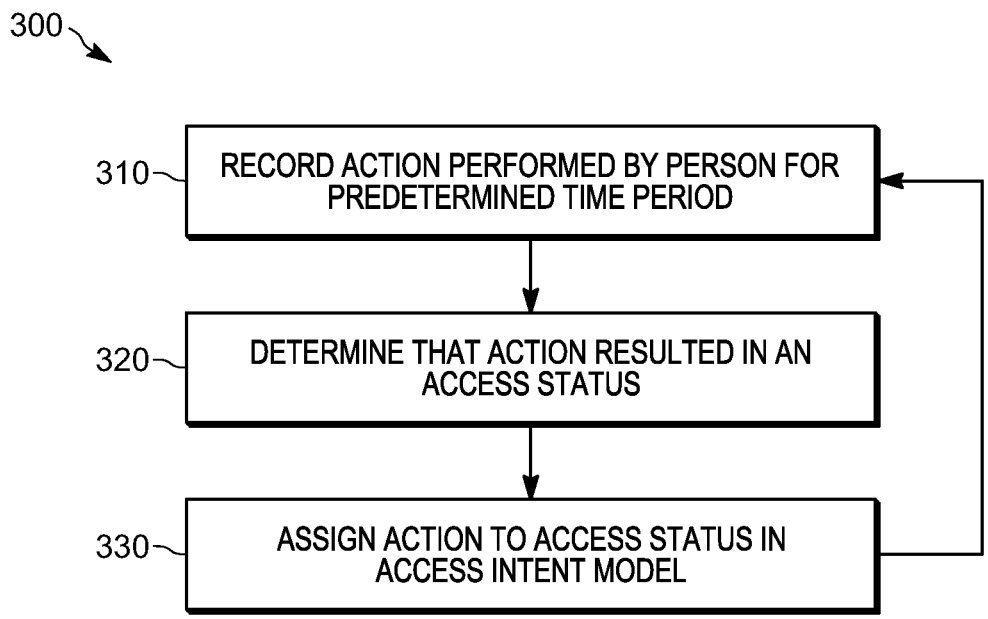
FIG. 3 is a flowchart of a method for self-training the access control system of FIG. 2 in accordance with some embodiments.

FIG. 3 is flowchart of an example method 300 for self-training the access control system 200. The method 300 includes recording, using the one or more access control sensors 120, an action performed by a person (or persons) for a predetermined time period (at block 310). The one or more access control sensors 120 detects that the person entered a point of view of the one or more access control sensors 120. The one or more access control sensors 120 then records actions performed by the person. The one or more access control sensors 120 is, for example, a video camera that records video of the point of view of the one or more access control sensors 120. The actions performed by the person may vary based on the intent of the person. For example, a person wishing to enter a facility may walk toward the access point 100. A person not entering the facility may walk away or tangentially by the access point 100. The one or more access control sensors 120 detects the actions performed by the person for the predetermined time period. The predetermined time period may be preset into the access control system 200.

The method 300 includes determining, using the verification sensor 130, that the action caused a change in an access status (at block 320). The access status can take one of two values: (i) a first access status; or (ii) a second access status. The first access status corresponds to a person entering through the access point 100. The second access status corresponds to a person not entering through the access point 100. The verification sensor 130 detects whether the person accessed the facility through the access point 100 after the action is recorded.

The method 300 includes assigning, using the electronic processor 210, the action to the access status in the access intent model 280 (at block 330). The access intent model 280 includes a mapping between actions and one of the first access status or a second access status. When the action results in the first access status, the electronic processor 210 assigns the action to the first access status and stores this mapping in the access intent model 280. When the action results in the second access status, the electronic processor 210 assigns the action to the second access status and stores this mapping in the access intent model 280.

Accordingly, the access intent model 280 maps each action performed by a person to whether the person accessed the facility through the access point 100. The learning engine 260 uses this data (i.e., the actions and the corresponding access status) to train the access intent model 280 for predicting whether a person has the intent to access the facility through the access point 100.

The electronic processor 210 trains the access intent model 280 using the data received from one or more access control sensors 120 and the verification sensor 130. Additionally, the electronic processor 210 also trains the access intent model 280 using historical access data associated with the access point 100. The electronic processor 210 continuously receives access data associated with actions of one or more persons in the vicinity of the access point 100 or interactions of the one or more person with the access point 100 and continuously trains the access intent model 280 with the access data. The electronic processor 210 continues to train the access intent model 280 even after the access intent model 280 is deployed for controlling the access point 100 as discussed below.

Figure 4:
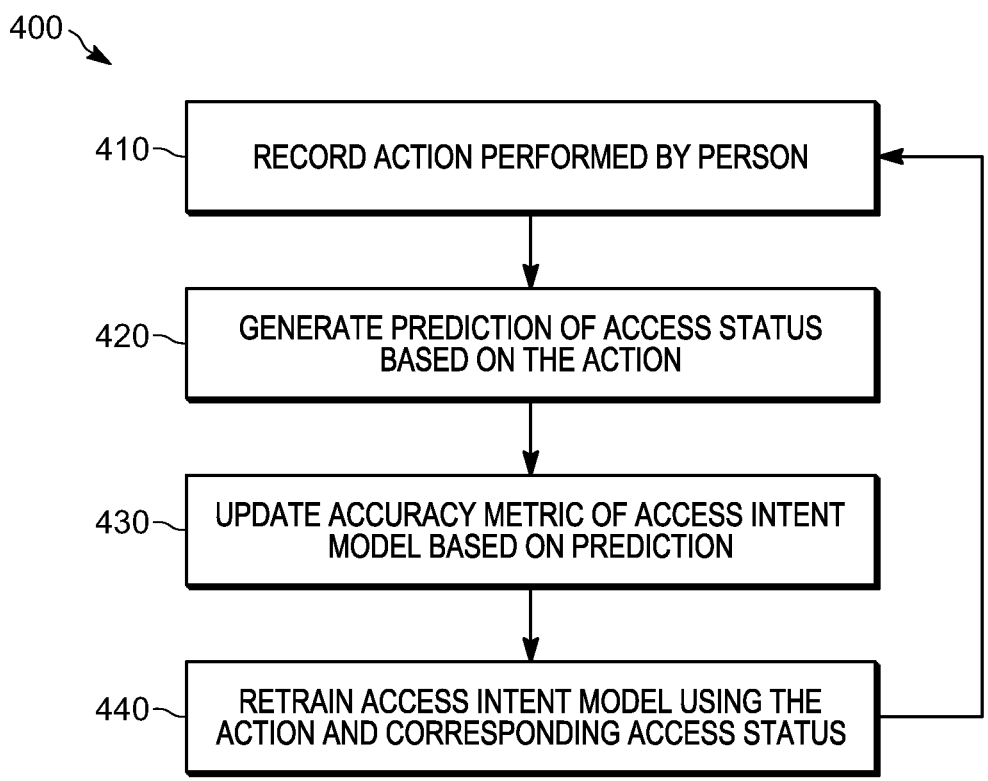
FIG. 4 is a flowchart of a method for self-testing the access control system of FIG. 2 in accordance with some embodiments.

FIG. 4 is flowchart of an example method 400 for self-testing the access control system 200. The method 400 includes recording, using the one or more access control sensors 120, an action performed by a person (at block 410). The one or more access control sensors 120 detects that the person entered a point of view of the one or more access control sensors 120. The one or more access control sensors 120 then records actions performed by the person. The actions performed by the person may vary based on the intent of the person. The one or more access control sensors 120 may detect the actions performed by the person for the predetermined time period.

The method 400 includes generating, using the access intent model 280, a prediction of the access status based on the action (at block 420). The electronic processor 210 uses the access intent model 280 to predict the intent of the third person based on the third action. For example, the electronic processor 210 determines whether the detected action is similar to the actions assigned to the first access status or similar to the actions assigned to the second access status. Based on this determination, the electronic processor 210 predicts whether the person is going to access the facility through the access point 100.

The method 400 includes updating, using the electronic processor 210, an accuracy metric of the access intent model

280 based on the prediction (at block 430). The electronic processor 210 determines, using the verification sensor 130, whether the third person accessed the facility through the access point 100. The electronic processor 210 then determines whether the prediction generated based on the access intent model 280 is accurate. The electronic processor 210 increases an accuracy metric when the prediction is accurate and decreases an accuracy metric when the prediction is not accurate. The accuracy metric may be a percentage of times the prediction is accurate.

The method 400 includes retraining, using the electronic processor 210, access intent model 280 using the action and corresponding access status (at block 440). The electronic processor 210 assigns the action to the corresponding access status in the access intent model 280. The access control system 200 therefore uses the same dataset for both self-testing and self-training.

Figure 5:
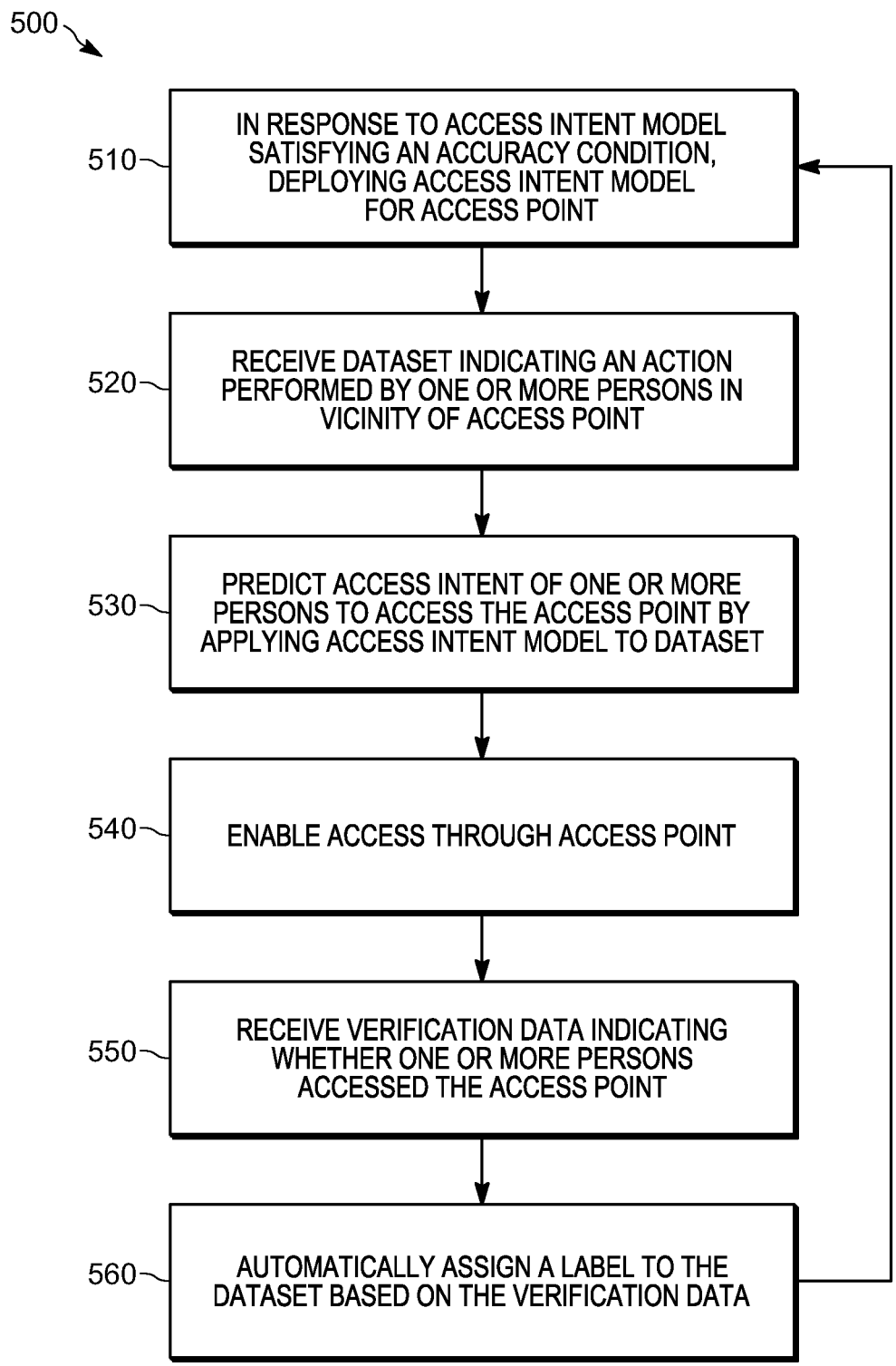
FIG. 5 is a flowchart illustrating a method of providing access control using the access control system of FIG. 2 in accordance with some embodiments.

FIG. 5 is flowchart of an example method 500 for providing access control using the access control system 200. The method 500 includes in response to the access intent model 280 satisfying an accuracy condition, deploying the access intent model 280 for the access point 100 (at block 510). The electronic processor 210 determines whether the accuracy metric exceeds an acceptable threshold. For example, the electronic processor 210 may determine whether the accuracy metric is above 90%. When the accuracy metric meets a predetermined threshold, the accuracy condition is satisfied. When the access intent model 280 meets the accuracy condition, the electronic processor 210 deploys the access intent model 280 to control the access point 100.

The method 500 includes receiving, from one or more access control sensors configured to detect actions performed by one or more persons in a vicinity of the access point 100, a dataset indicating an action performed by one or more persons in a vicinity of the access point 100 (at block 520). The electronic processor 210 receives the dataset from the one or more access control sensors 120. The dataset may include, for example, a video recording of the actions performed by persons within the vicinity of the one or more access control sensors 120. The dataset may include additional information that may be helpful in determining the intent of the persons. As used herein, in vicinity of the access point 100 or the one or more access control sensors 120 includes an object or person in a field of view of the one or more access control sensors 120. For example, in the vicinity of the access point 100 includes, when the access control sensors 120 is a camera, the field of view of the camera. When other sensors are used for the access control sensors 120 the vicinity of the access point 100 includes the sensing range of the applicable sensor.

The method 500 includes predicting, using the electronic processor 210, access intent of the one or more persons to access the access point 100 by applying access intent model 280 to the dataset (at block 530). The electronic processor 210 uses the access intent model 280 to generate access intent predictions for persons based on the received dataset. As discussed above, the electronic processor 210 receives the dataset including data from the one or more access control sensors 120 regarding actions performed by one or more persons for a predetermined period of time. The electronic processor 210 generates the predictions by applying the access intent model 280 to the dataset.

The method 500 also includes enabling, using the electronic processor 210, access through the access point 100 (at block 540). The electronic processor 210 determines the intent of the one or more persons using the dataset. The electronic processor 210 enables access through the access point 100 for the one or more persons when the access intent model 280 predicts that the one or more persons has an intent to access the access point 100. Enabling the access point 100 includes providing a signal to the actuator 140 to open or unlock the entryway 110. For example, the actuator 140 may open or unlock doors of the entryway 110 when the electronic processor 210 enables the access point 100.

The method 500 includes receiving, from the verification sensor 130 configured to verify access of the access point by the one or more persons, verification data indicating whether the one or more persons accessed the access point 100 (at block 550). The verification sensor 130 determines whether the one or more persons accessed the access point 100 when access through the access point 100 is enabled. The verification sensor 130 may include a light sensor or other sensor that detects when a person enters through the access point 100. The verification sensor 130 provides the verification data to the electronic processor 210.

The method 500 includes automatically assigning, with the electronic processor 210, a label to the dataset based on the verification data (at block 560). The label indicates whether the one or more persons accessed the access point 100. The electronic processor 210 associates the dataset to one of the first access status (that is, the person accessed the facility through the access point 100) or the second access status (that is, the person did not access the facility through the access point 100). The label includes one of the first access status or the second access status. The electronic processor 210 updates the access intent model 280 based on the labeled dataset. For example, the label and the dataset are stored in the memory 220 and used to train the access intent model 280.

In some embodiments, the access point 100 also includes a failsafe mechanism to control access through the access point 100. The failsafe mechanism includes, for example, actuating the entryway 110 when a person is detecting or based on a person scanning a key card rather than based on predicting an intent of the person. The failsafe mechanism may be used at the access point 100 during self-training of the access control system 200 or when the accuracy metric of the access intent model 280 falls below a threshold after deploying the access intent model 280. The electronic processor 210 determines whether the accuracy metric has fallen below the acceptable threshold. In response to the accuracy metric has fallen below the acceptable threshold, the electronic processor 210 stops using the access intent model 280 to control the access point 100 and uses the failsafe mechanism to control the access point 100. In some embodiments, the failsafe mechanism may also be used to control the access point 100 as a backup mechanism when the access intent model 280 generates an incorrect prediction.

The electronic processor 210 also tests the access intent model 280 based on the labeled dataset. The electronic processor 210 updates the accuracy metric of the access intent model 280 based on whether the prediction generated is accurate as discussed above in the method 400. When the accuracy metric falls below a threshold, the electronic processor 210 controls the access point 100 using the failsafe mechanism and without using the access intent model 280.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. An access control system, the system comprising:
   one or more access control sensors configured to detect actions performed by one or more persons in a vicinity of an access point;
   a verification sensor configured to verify entrance through the access point by the one or more persons; and
   an electronic processor communicatively coupled to the one or more access control sensors and the verification sensor, the electronic processor configured to
      in response to an access intent model satisfying an accuracy condition, deploy the access intent model for the access point,
      receive, from the one or more access control sensors, a dataset indicating an action performed by one or more persons in the vicinity of the access point,
      predict an access intent of the one or more persons to access the access point by applying the access intent model to the dataset,
      enable access through the access point,
      receive, from the verification sensor, verification data indicating whether the one or more persons entered through the access point, and
      automatically assign a label to the dataset based on the verification data, the label indicating whether the one or more persons entered through the access point.

2. The system of claim 1, wherein the electronic processor is further configured to train the access intent model using historical access data associated with the access point.

3. The system of claim 1, wherein the electronic processor is further configured to continuously receive access data associated with actions of one or more persons in the vicinity of the access point and continuously train the access intent model with the access data.

4. The system of claim 1, wherein the electronic processor is further configured to update the access intent model based on the labeled dataset.

5. The system of claim 1, wherein the electronic processor is further configured to test the access intent model based on the labeled dataset.

6. The system of claim 1, wherein the electronic processor is configured to enable entrance through the access point for the person when the access intent model predicts that the person has an intent to access the access point.

7. The system of claim 1, wherein the electronic processor is further configured to
    record, using the one or more access control sensors, a second action performed by a second person for a predetermined time period;
    determine, using the verification sensor, that the action resulted in an access status; and
    assign the second action to the access status in the access intent model.

8. The system of claim 1, wherein the electronic processor is further configured to
    record, using the one or more access control sensors, a third action performed by a second person for a predetermined time period;
    generate a prediction of access status based on the action;
    update an accuracy metric of the access intent model based on the prediction, wherein the accuracy condition is satisfied when the accuracy metric exceeds an acceptable threshold; and
    retrain the access intent model using the third action and the corresponding access status.

9. The system of claim 8, wherein the electronic processor is configured to operate the access point using a failsafe mechanism when the accuracy condition is not satisfied.

10. The system of claim 9, wherein the electronic processor is configured to
    determine that the accuracy metric has fallen below the acceptable threshold; and
    in response to the accuracy metric falling below the acceptable threshold stop using the access intent model to control the access point; and
    control the access point using the failsafe mechanism.

11. A method of providing access control, the method comprising:
    in response to an access intent model satisfying an accuracy condition, deploying the access intent model for an access point;
    receiving, from one or more access control sensors configured to detect actions performed by one or more persons in a vicinity of the access point, a dataset indicating an action performed by the one or more persons in the vicinity of the access point,
    predicting, with an electronic processor, an access intent of the one or more persons to access the access point by applying the access intent model to the dataset,
    enabling, with the electronic processor, access through the access point,
    receiving, from a verification sensor configured to verify entrance through the access point by the one or more persons, verification data indicating whether the one or more persons entered through the access point;
    automatically assigning, with the electronic processor, a label to the dataset based on the verification data, the label indicating whether the one or more persons entered through the access point.

12. The method of claim 11, further comprising training the access intent model using historical access data associated with the access point.

13. The method of claim 11, further comprising continuously receiving access data associated with actions of one or more persons in the vicinity of the access point and continuously training the access intent model with the access data.

14. The method of claim 11, further comprising:
    updating the access intent model based on the labeled dataset.

15. The method of claim 11, further comprising:
    testing the access intent model based on the labeled dataset.

16. The method of claim 11, wherein enabling access through the access point for the person includes enabling entrance through the access point for the one or more persons when the access intent model predicts that the one or more persons has an intent to access the access point.

17. The method of claim 11, further comprising:
    recording, using the one or more access control sensors, a second action performed by a second person for a predetermined time period;
    determining, using the verification sensor, that the action resulted in an access status; and
    assigning, using the electronic processor, the second action to the access status in the access intent model.

18. The method of claim 11, further comprising:
    recording, using the one or more access control sensors, a third action performed by a second person for a predetermined time period;
    generating a prediction of access status based on the action;
    updating an accuracy metric of the access intent model based on the prediction, wherein the accuracy condition is satisfied when the accuracy metric exceeds an acceptable threshold; and
    retraining the access intent model using the third action and the corresponding access status.

19. The method of claim 18, operating the access point using a failsafe mechanism when the accuracy condition is not satisfied.

20. The system of claim 19, further comprising
    determining that the accuracy metric has fallen below the acceptable threshold; and
    in response to the accuracy metric falling below the acceptable threshold stopping using the access intent model to control the access point; and
    controlling the access point using the failsafe mechanism.

* * * * *